United States Patent
Zhang et al.

(10) Patent No.: US 8,938,268 B2
(45) Date of Patent: Jan. 20, 2015

(54) METHOD AND APPARATUS FOR FACILITATING A LAYERED CELL SEARCH FOR LONG TERM EVOLUTION SYSTEMS

(75) Inventors: Xiaoxia Zhang, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 555 days.

(21) Appl. No.: 12/949,233

(22) Filed: Nov. 18, 2010

(65) Prior Publication Data

US 2011/0287792 A1     Nov. 24, 2011

Related U.S. Application Data

(60) Provisional application No. 61/264,221, filed on Nov. 24, 2009, provisional application No. 61/380,588, filed on Sep. 7, 2010.

(51) Int. Cl.
  *H04B 15/00*     (2006.01)
  *H04J 11/00*     (2006.01)

(52) U.S. Cl.
  CPC .......... *H04J 11/0056* (2013.01); *H04J 11/0043* (2013.01); *H04J 11/0093* (2013.01)
  USPC ........... 455/501; 455/436; 455/449; 370/328; 370/338

(58) Field of Classification Search
  CPC ...................................................... H04B 1/7083
  USPC .......... 455/501, 63.1, 114.2, 278.1, 296, 436, 455/442, 449; 370/144, 148, 220, 346, 328, 370/338
  See application file for complete search history.

(56) References Cited

U.S. PATENT DOCUMENTS 8,068,834 B2 *   11/2011   Amerga et al. ............... 455/436
8,208,434 B2 *   6/2012   Sayana et al. ................ 370/329

(Continued)

FOREIGN PATENT DOCUMENTS

CN     1436434 A     8/2003
CN     1706141 A     12/2005

(Continued)

OTHER PUBLICATIONS

Guey, J.C., "Improving the Robustness of Target Cell Search in WCDMA Using Interference Cancellation", Wireless Networks, Communications and Mobile Computing, 2005 International Conference on Maui, HI, USA Jun. 13-16, 2005, Piscatawey, NJ, USA, IEEE vol. 2, Jun. 13, 2005, pp. 879-883.*

(Continued)

*Primary Examiner* — Nay A Maung
*Assistant Examiner* — Angelica M Perez
(74) *Attorney, Agent, or Firm* — Nerrie M. Zohn

(57) ABSTRACT

A method for ranking signals isolates and cancels neighboring cells using layering. Received signals from various cells are grouped into layers, with each layer comprised of received signals which are comparable within a particular metric (such as signal strength). The signals within a particular layer may also be ranked according to a desired metric. At the beginning of a cancellation cycle the UE may perform the layering and ranking. Once the layering and ranking has been performed the UE may continue to use the layering and ranking for later rounds of cancellation, freeing up processing resources that would otherwise be dedicated to repeated ranking of received signals. After a period of time, the cancellation cycle may repeat and the layering and ranking may be performed again.

22 Claims, 9 Drawing Sheets

(56) References Cited

U.S. PATENT DOCUMENTS

| | | | |
|---|---|---|---|
| 8,447,005 B2* | 5/2013 | Axmon et al. ................ | 375/365 |
| 8,553,820 B2* | 10/2013 | Kwak et al. .................. | 375/347 |
| 8,811,333 B2* | 8/2014 | Dinan .......................... | 370/330 |
| 2003/0081571 A1* | 5/2003 | Hur ............................... | 370/331 |
| 2007/0149242 A1* | 6/2007 | Kim et al. ..................... | 455/525 |

FOREIGN PATENT DOCUMENTS

| | | | | |
|---|---|---|---|---|
| CN | 1863382 A | 11/2006 | | |
| JP | H09505199 A | 5/1997 | | |
| JP | 2002538656 A | 11/2002 | | |
| KR | 20050021511 A | 3/2005 | | |
| WO | WO 96/01544 | * | 1/1996 | ............ H04Q 7/32 |
| WO | WO9601544 A2 | 1/1996 | | |
| WO | WO-0051249 A1 | 8/2000 | | |
| WO | WO0055992 A1 | 9/2000 | | |
| WO | WO-2009022967 A2 | 2/2009 | | |

OTHER PUBLICATIONS

Guey J.C., et al., "Improving the Robustness of Target Cell Search in WCDMA Using Interference Cancellation", Wireless Networks, Communications and Mobile Computing, 2005 Internati Onal Conference on Maui, HI, USA Jun. 13-16, 2005, Piscataway, NJ, USA,IEEE, vol. 2, Jun. 13, 2005, pp. 879-883, XP010888077, DOI: 10.1109/WIRLES.2005.1549528 ISBN: 978-0-7803-9305-9.

International Search Report and Written Opinion—PCT/US2010/057892, International Search Authority—European Patent Office—Apr. 6, 2011.

Taiwan Search Report—TW099140626—TIPO—Jan. 13, 2014.

* cited by examiner

METHOD AND APPARATUS FOR FACILITATING A LAYERED CELL SEARCH FOR LONG TERM EVOLUTION SYSTEMS

CROSS REFERENCE TO RELATED APPLICATIONS

This application claims the benefit of U.S. provisional patent applications no. 61/264,221 filed Nov. 24, 2009, in the names of ZHANG et al., and U.S. provisional patent application no. 61/380,588 filed Sep. 7, 2010, in the names of BHATTAD et al., the disclosures of which are expressly incorporated herein by reference in their entireties.

BACKGROUND

1. Field

Aspects of the present disclosure relate generally to wireless communication systems, and more particularly to facilitating a layered cell search for Long Term Evolution (LTE) wireless communication systems.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

SUMMARY

The present disclosure relates to ranking signals to isolate and cancel neighboring cells using layering. Received signals from various cells may be grouped into layers, with each layer including received signals which are comparable within a particular metric (such as signal strength). The signals within a particular layer may also be ranked according to a desired metric. At the beginning of a cancellation cycle the UE may perform the layering and ranking. Once the layering and ranking has been performed, in some aspects, the UE may continue to use the layering and ranking for later rounds of cancellation, freeing up processing resources that would otherwise be dedicated to repeated ranking of received signals.

In one aspect of the present disclosure, a method is provided for ranking signals received from neighboring cells in a wireless communication network. The method includes searching for received signals from neighboring cells. The method also includes grouping a first set of received signals. The method also includes performing interference cancellation (IC) on the first set of received signals. The method further includes grouping a second set of received signals. The second set includes signals from remaining received signals. Still further, the method includes ranking the received signals in the first set and second set. The ranking includes determining a rank of a given received signal based on which given set contains the given received signal.

In another aspect of the present disclosure, an apparatus is configured to rank signals received from neighboring cells in a wireless communication network. The apparatus includes means for searching for received signals from neighboring cells. The apparatus also includes means for grouping a first set of received signals. The apparatus also includes means for performing interference cancellation (IC) on the first set of received signals. The apparatus further includes means for grouping a second set of received signals. The second set includes signals from remaining received signals. Still further, the apparatus includes means for ranking the received signals in the first set and second set by determining a rank of a given received signal based on which given set contains the given received signal.

In yet another aspect of the present disclosure, a computer program product is configured to rank signals received from neighboring cells in a wireless communication network. The computer program product has a computer-readable medium with program code recorded thereon. The program code includes program code to search for received signals from neighboring cells. The program code also includes program code to group a first set of received signals. The program code also includes program code to perform interference cancellation (IC) on the first set of received signals. The program code further includes program code to group a second set of received signals. The second set includes signals from remaining received signals. Still further, the program code includes program code to rank the received signals in the first set and second set by determining a rank of a given received signal based on which given set contains the given received signal.

In a further aspect of the present disclosure, an apparatus is configured to rank signals received from neighboring cells in a wireless communication network. The apparatus has processor(s) and a memory coupled to the processor(s). The processor(s) is configured to search for received signals from neighboring cells. The processor(s) is also configured to group a first set of received signals. The processor(s) is also configured to perform interference cancellation (IC) on the first set of received signals. The processor(s) is further configured to group a second set of received signals. The second set includes signals from remaining received signals. Still further, the processor(s) is configured to rank the received signals in the first set and second set by determining a rank of a given received signal based on which given set contains the given received signal.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
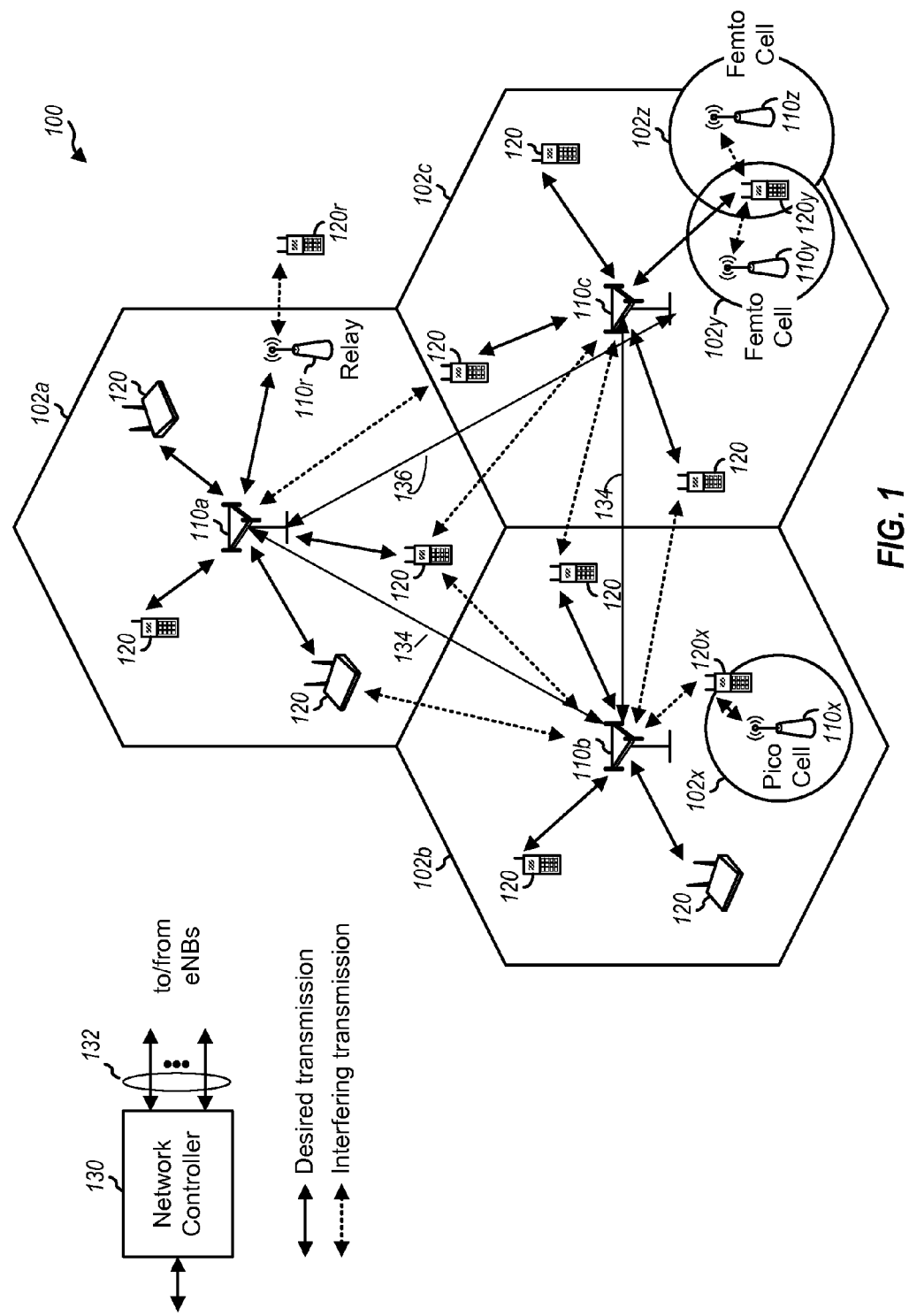
FIG. 1 is a block diagram conceptually illustrating an example of a mobile communication system.

FIG. 1 shows a wireless communication network 100, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110$a$, 110$b$ and 110$c$ are macro eNBs for the macro cells 102$a$, 102$b$ and 102$c$, respectively. The eNB 110$x$ is a pico eNB for a pico cell 102$x$. And, the eNBs 110$y$ and 110$z$ are femto eNBs for the femto cells 102$y$ and 102$z$, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110$r$ may communicate with the eNB 110$a$ and a UE 120$r$, in which the relay station 110$r$ acts as a relay between the two network elements (the eNB 110$a$ and the UE 120$r$) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
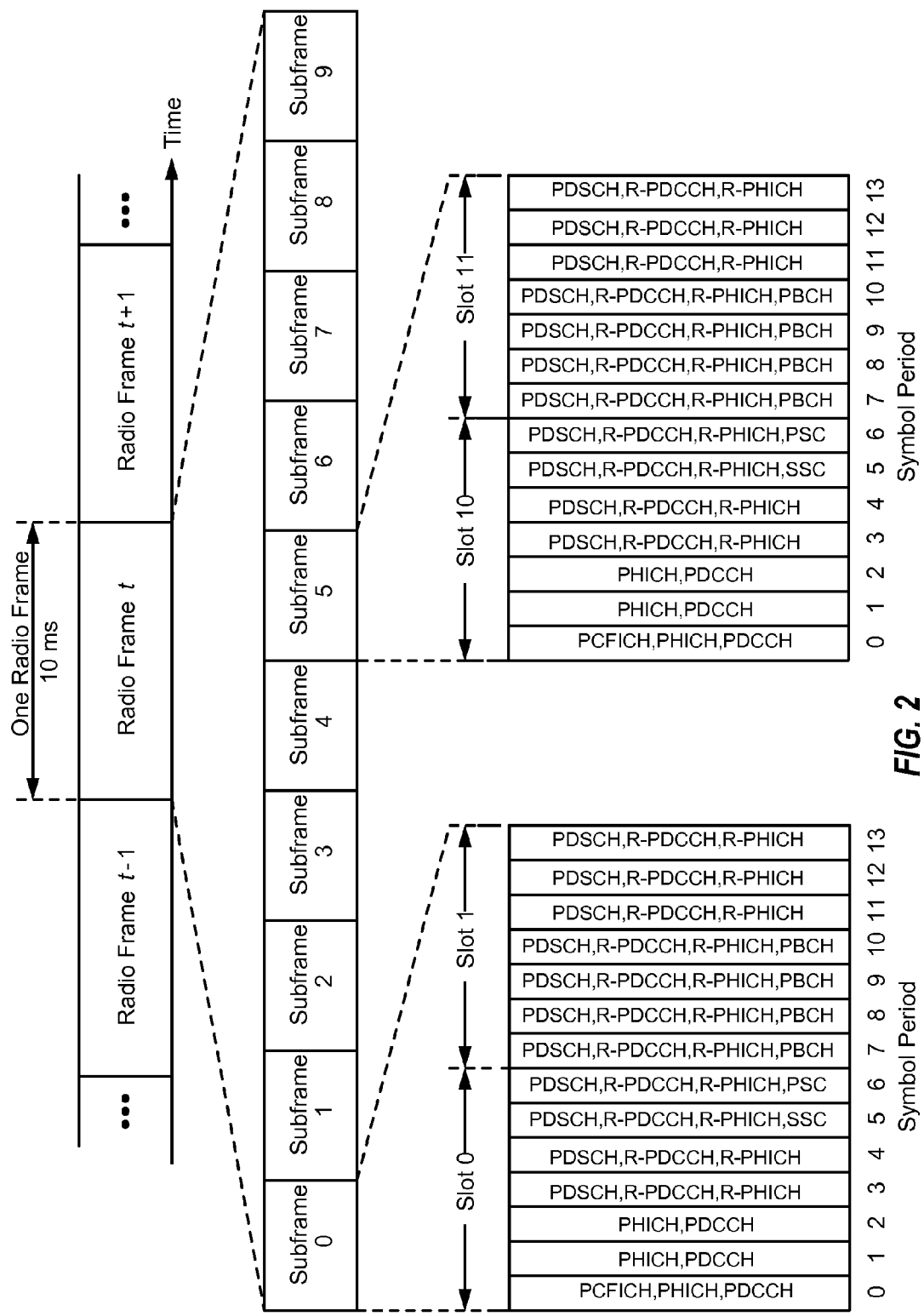
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
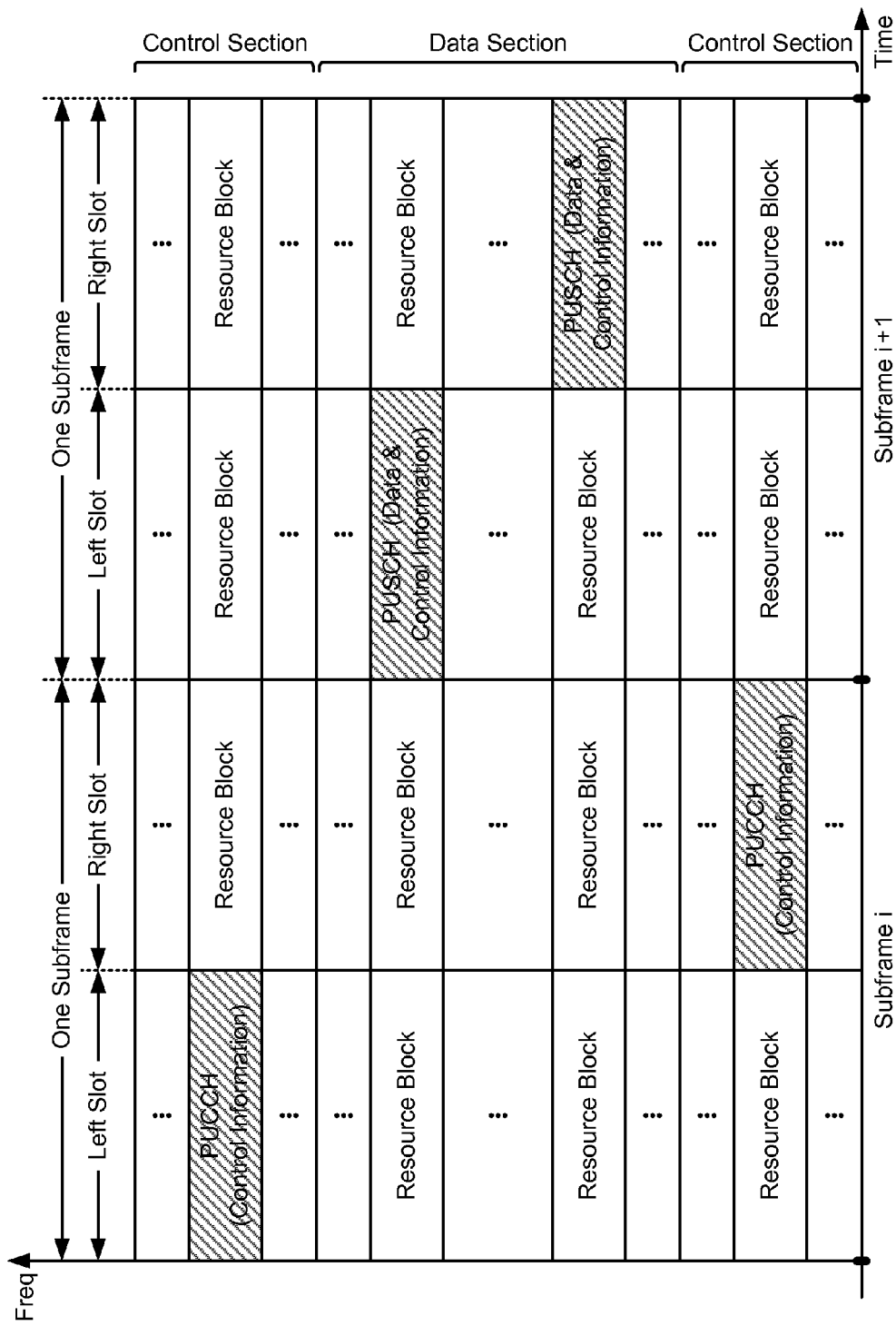
FIG. 3 is a block diagram conceptually illustrating an exemplary frame structure in uplink communications.

FIG. 3 is a block diagram conceptually illustrating an exemplary frame structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSS, SSS, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
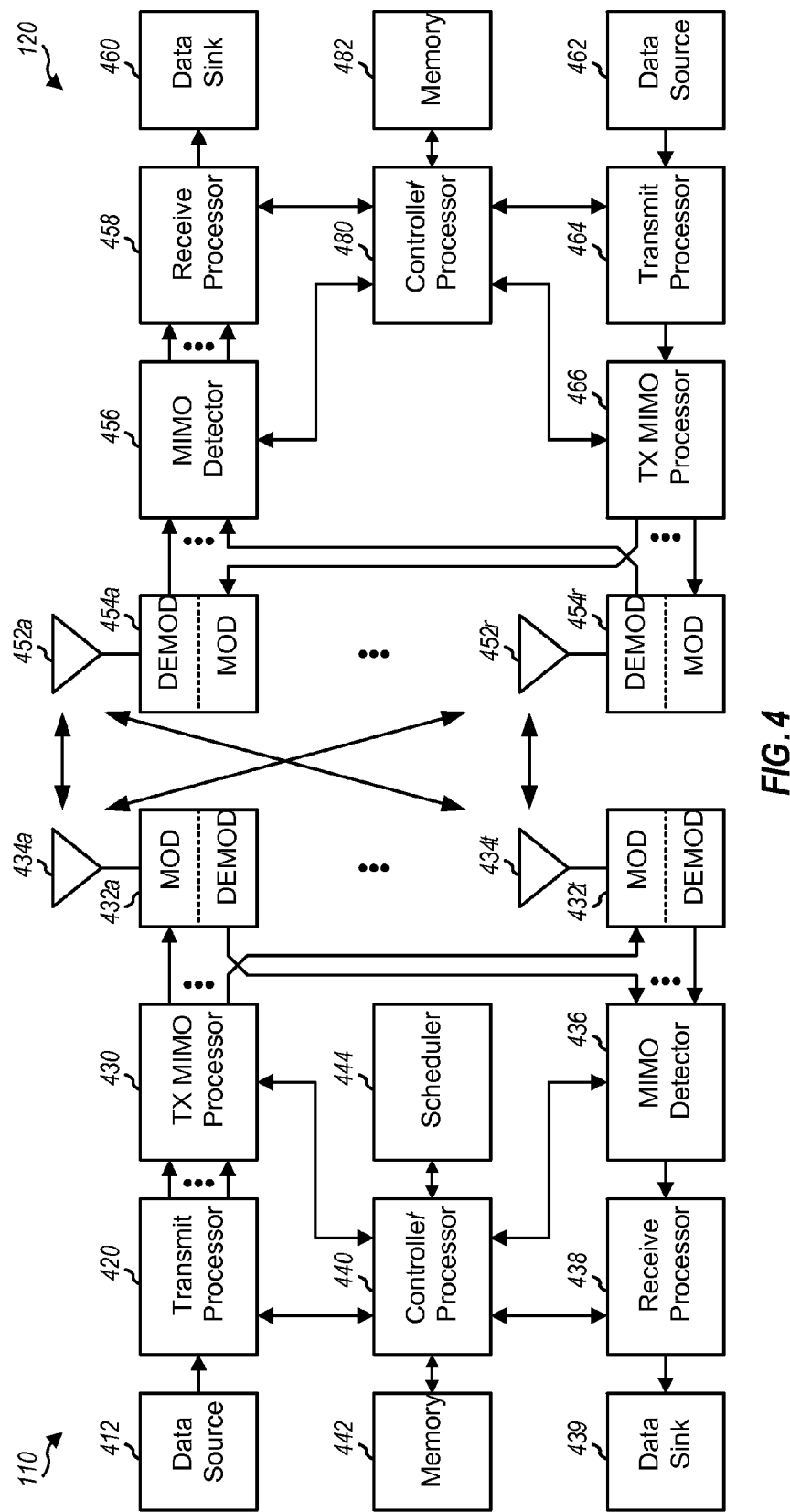
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. The base station 110 may be the macro eNB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 5, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
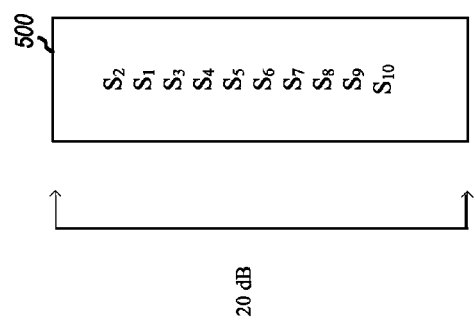
FIG. 5 is an exemplary schematic illustrating received cell signals in the prior art.

A number of methods may be employed by a UE to isolate and cancel neighboring cells. As shown in FIG. 5, conventionally a UE may receive signals from a variety of cells 500 within a particular metric range (shown as 20 dB) represented by S1-S10. The UE would then perform interference cancellations on those signals using the Primary Synchronization Signals and Secondary Synchronization Signals to isolate the signals from various cells. Typically, following each cancellation the UE would normalize the remaining signal making it difficult to accurately rank received signals by a particular metric such as signal strength. Accordingly, the UE may believe that a particular signal (shown in FIG. 5 as S2) is stronger than the actual strongest received signal (shown in FIG. 5 as 51) because the signals are only measured upon cancellation, after normalization.

Presented, is a method for isolating, ranking, and cancelling neighboring cells using signal layering. Received signals from various cells are grouped into layers or sets. Each layer has received signals which are comparable within a particular metric range (e.g., signal strength, or signal to noise plus interference ratio). The signals within a particular layer are ranked according to a desired metric (e.g., signal strength or signal to noise plus interference ratio). At the beginning of a cancellation cycle the UE may perform the layering and ranking. Once the layering and ranking has been performed the UE may continue to use the determined ranking for later rounds of cancellation, freeing up processing resources that would otherwise be dedicated to repeatedly ranking received signals. After a period of time the cancellation cycle may repeat; that is, the UE may perform the layering and ranking again.

Figure 6:
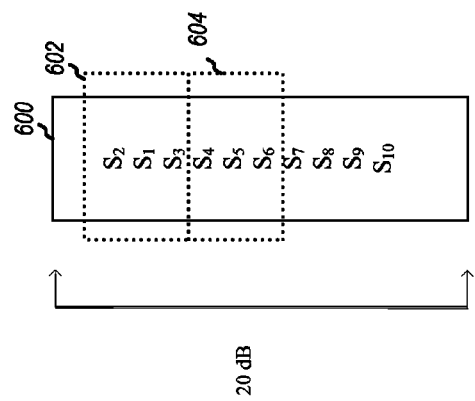
FIG. 6 is an exemplary schematic illustrating layering of received signals according to one aspect of the present disclosure.
Figure 7:
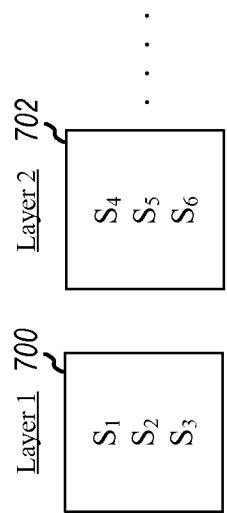
FIG. 7 is an exemplary schematic illustrating layering of received signals according to one aspect of the present disclosure.

As shown in FIG. 6, the UE receives a number of cell signals, shown in block 600. The received signals may vary within a range corresponding to a particular metric, such as 20 dB in signal strength as shown. In the present disclosure the received signals are grouped into layers for interference cancellation. The first layer, shown in FIG. 6 as block 602, is cancelled from the received signals prior to the grouping of the next set of received signals into the second layer, shown in FIG. 6 as block 604. Following a cancellation, the remaining signals may be normalized prior to the next cancellation. The layers are ranked against each other, such that signals in the first layer are ranked higher than signals in successive layers, etc. as shown in FIG. 7. The group of cells 700 in Layer 1 are ranked higher than the grouping of cell 702 in Layer 2. The signals within each layer may also be ranked against each other so the UE knows how signals within a layer compare to each other based on a selected metric, such as signal strength, or signal to noise plus interference ratio. For example, in Layer 1 700 S1 is the highest ranked signal followed by S2 and S3.

A UE may periodically perform a search for signals received by neighbor cells. A time period between searches may be between 200-800 ms, though other periods may be employed. When the search is completed the UE may combine multiple bursts of received Primary Synchronization Signals (PSS) for timing detection. For example, four bursts may be combined. The UE may then combine multiple bursts of received Secondary Synchronization Signals (SSS) for detection. For example, four bursts may be combined.

The top signals received by the UE may be grouped together. For example, a number of signals all within a certain metric range (for example, signals within a certain number of dBs) are grouped into a layer. The grouping of signals with the highest values of the metric will be grouped in Layer 1. In one aspect, if there is a single received signal which is at a certain level higher in the metric than the next received signal (for example, the strongest received signal is more than 6 dB stronger than the next strongest signal) Layer 1 may be constructed to have the signal with the highest metric value. The signals in Layer 1 are then grouped by the desired metric, such as received SSS strength. In one aspect the UE may include any signal that contains PBCH confirmation into Layer 1, regardless of whether the signal strength is outside of the metric range. For each cell signal the UE may record various data such as the cell ID, radio frame boundary timing information, cyclic prefix (CP) information, time stamp, and layer information.

Interference cancellation (IC) is then performed on the signals in Layer 1. Soft IC may be applied where a cancellation factor is used to scale the reconstructed signals. If frequency error information is available for a particular cell in the global cell information, the frequency error rotation may be applied to the interested cell to enhance cancellation performance. Following a cancellation, the remaining signals may be normalized prior to the next cancellation. Another search may then be performed to identify remaining cells which have not been cancelled. From that set of remaining cells the UE will then determine the next set of strongest cells, similar to the method described above for Layer 1. This next set of strongest cells will be grouped into Layer 2. The cells within Layer 2 may also be ranked according to a desired metric. Similar information is recorded for those cells as were recorded for the cells in Layer 1. The UE may continue this process to group received signals into three, four, or more layers.

Figure 8:
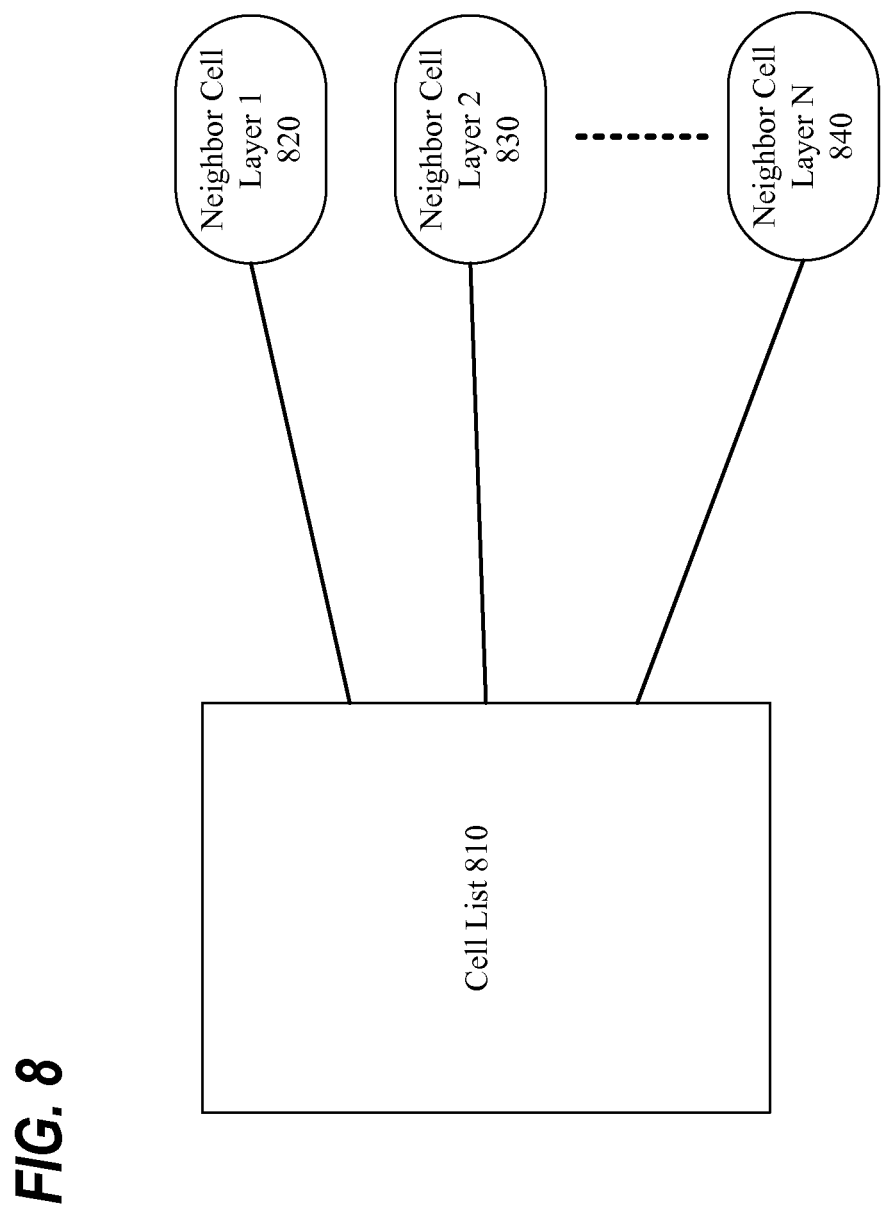
FIG. 8 is an exemplary schematic illustrating a neighboring cell list according to one aspect of the present disclosure.

The UE may then maintain the grouping and ranking of signals into layers into a cell list for later use. FIG. 8 shows a sample such cell list 810 containing the cells for Layer 1 820, Layer 2 830, through Layer N 840. The UE may then schedule reference signal received power (RSRP) measurement and adjust the ranking of the cells in the cell list based on the RSRP measurements.

The ranking may then be used for other logical operations, such as common reference signal (CRS) IC or physical broadcast channel (PBCH) IC as described in U.S. provisional patent applications No. 61/380,588 filed Sep. 7, 2010, in the name of BHATTAD et al., the disclosure of which is expressly incorporated herein by reference in its entirety. Similarly, CRS analysis could be used to improve the layered ranking of the present disclosure.

The cell list may also be used by the UE for a next neighboring cell search cycle. Using the cell list for the next search cycle will enable that cycle to be performed using fewer processing resources as the cell list will allow that cycle to skip the step of ranking the received cells and perform interference cancellation with the established ranking and cell list. Thus, power savings is achieved. After a number of cycles the UE may perform cell layering and ranking again to ensure that the cell list is correct.

Figure 9A:
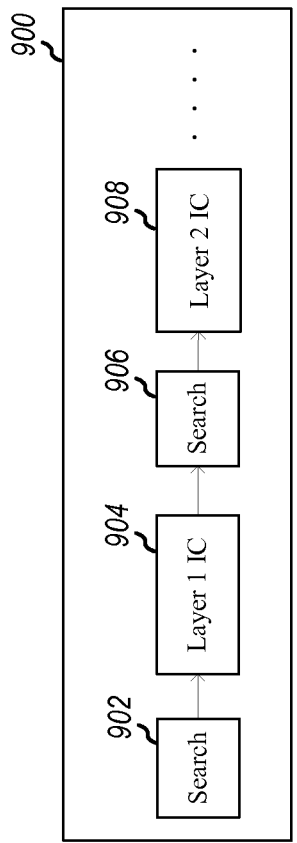
FIGS. 9A and 9B illustrate interference cancelation methods according to aspects of the present disclosure.

FIG. 9A shows a sample block of searching and layering, 900. In block 902 a search for neighboring cell signals occurs. At block 904 a first set of signals are grouped into Layer 1 and IC is performed. In block 906 a search for remaining neighboring cell signals occurs. At block 908 a second set of signals from the remaining neighboring cell signals are grouped into Layer 2 and IC is performed. This process is repeated until the UE has completed its searching. The layers are ranked and the signals within each layer may also be ranked.

Figure 9B:
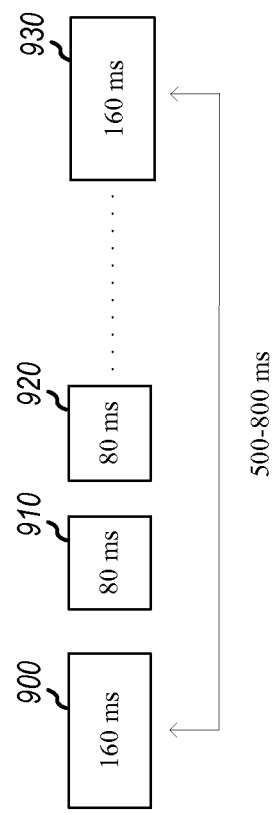

Each of these blocks takes a certain amount of processing resources and time. For example, as shown in FIG. 9B the block of searching and layering 900 may take 160 ms. Once the layering is completed in block 900, however, neighboring cell search cycles 910 and 920 may utilize the layering results of block 900 in order to complete their interference cancellation in a shorter time, shown in FIG. 9B as 80 ms. Thus, the layering results and cell list may be used to reduce resource usage by subsequent cell cycles. After a period of time, shown in FIG. 9B as 500-800 ms, (though that period may be adjusted), a new block 930 may repeat the layering and ranking process. Accordingly that new block will take longer to execute, illustrated as 160 ms, the same length of time for block 900.

Figure 10:
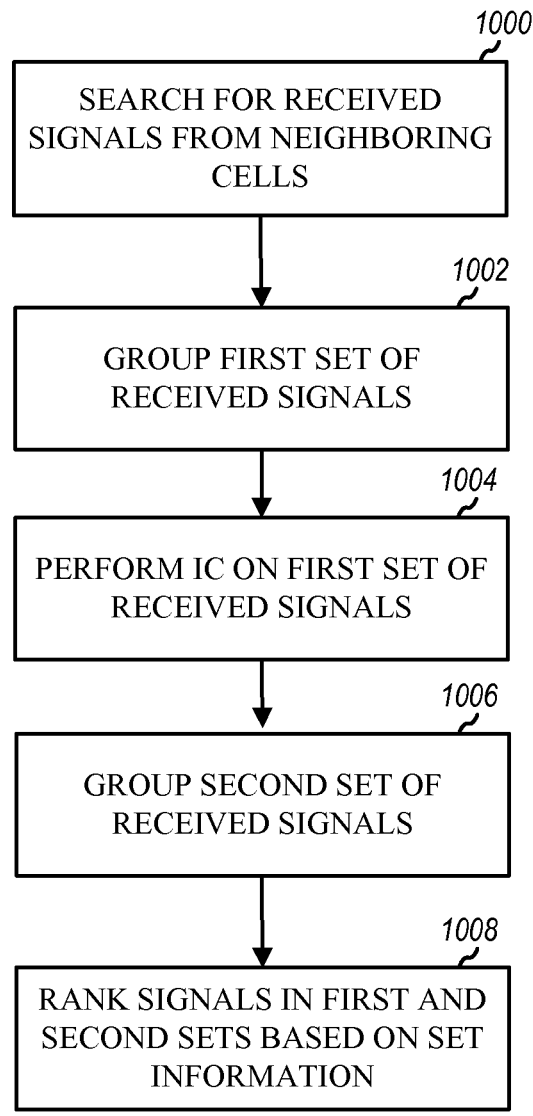
FIG. 10 is a flow diagram according to one aspect of the present disclosure.

FIG. 10 is a flow diagram illustrating layered interference cancellation according to one aspect of the present disclosure. First the UE searches for received signals from neighboring cells, as shown in block 1000. The UE then groups a first set of received signals into a first layer as shown in block 1002. The UE then performs interference cancellation (IC) on the first set of received signals as shown in block 1004. As shown in block 1006, the UE then searches for remaining received signals from neighboring cells after performing IC. Next, the UE groups a second set of received signals into a second layer as shown in block 1008. Then the UE ranks the first and second set of received signals based at least in part on layer information, as shown in block 1010.

In one configuration, the UE 120 is configured for wireless communication with a method for ranking signals received from neighboring cells in a wireless communication network. The UE includes means for searching for received signals from neighboring cells and means for grouping a first set of received signals. The UE also includes means for performing interference cancellation (IC) on the first set of received signals and means for grouping a second set of received signals. The UE further includes means for ranking the received signals in the first set and second set.

In one aspect, the aforementioned means may be the processor(s), the controller/processor 480, the memory 482, the receive processor 458, the MIMO detector 456, and the antennas 452a and 452r, configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 10, may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of ranking signals received from neighboring cells in a wireless communication network comprising:
   detecting a set of signals from neighboring cells during a cell search period;
   grouping a first set of signals from the set of signals, the first set of signals comprising a first strongest signal and zero or more signals within a first threshold of the first strongest signal;
   performing interference cancellation (IC) on the first set of signals;
   normalizing at least one remaining signal, after performing IC on the first set of signals;
   detecting another set of signals from remaining neighboring cells after performing IC on the first set of signals;
   grouping a second set of signals, wherein the second set of signals is grouped from among the another set of signals, the second set of signals comprising a second strongest signal and zero or more signals within a second threshold of the second strongest signal; and
   ranking signals in the first set of signals and the second set of signals, the ranking comprising determining a rank of a specific signal.

2. The method of claim 1 wherein the ranking is further based on a priority of the specific signal within a specific set of signals.

3. The method of claim 1 in which the first set of signals and the second set of signals include a primary synchronization signal (PSS) and a secondary synchronization signal (SSS).

4. The method of claim 1 further comprising applying the ranking during one or more of a next neighboring cell search cycle, IC in another logical operation, or a combination thereof.

5. The method of claim 1 in which grouping the first set of signals and grouping the second set of signals further comprise grouping based at least in part on one or more of physical broadcast channel confirmation, cell specific reference signaling (CRS), channel state information reference signaling (CSI-RS), or a combination thereof.

6. The method of claim 1 further comprising using the ranking for later IC.

7. The method of claim 1 further comprising, for each detected signal, recording at least one or more of a cell ID, a radio frame boundary timing information, cyclic prefix (CP) information, a time stamp, layer information, or a combination thereof.

8. An apparatus configured to rank signals received from neighboring cells in a wireless communication network, the apparatus comprising:
means for detecting a set of signals from neighboring cells during a cell search period;
means for grouping a first set of signals from the set of signals, the first set of signals comprising a first strongest signal and zero or more signals within a first threshold of the first strongest signal; means for performing interference cancellation (IC) on the first set of signals;
means for normalizing at least one remaining signal, after performing IC on the first set of signals;
means for detecting another set of signals from remaining neighboring cells after performing IC on the first set of signals;
means for grouping a second set of signals, wherein the second set of signals is grouped from among the another set of signals, the second set of signals comprising a second strongest signal and zero or more signals within a second threshold of the second strongest signal;
and means for ranking signals in the first set of signals and the second set of signals by determining a rank of a specific signal.

9. The apparatus of claim 8 in which ranking is further based on a priority of the specific signal within a specific set of signals.

10. The apparatus of claim 8 further comprising means for applying the ranking during one or more of a next neighboring cell search cycle, IC in another logical operation, or a combination thereof.

11. The apparatus of claim 8 further comprising means for using the ranking for later IC.

12. A computer program product configured for ranking signals received from neighboring cells in a wireless communication network, computer program product comprising:
a non-transitory computer-readable medium having program code recorded thereon, the program code comprising: program code to detect a set of signals from neighboring cells during a cell search period;
program code to group a first set of signals from the set of signals, the first set of signals comprising a first strongest signal and zero or more signals within a first threshold of the first strongest signal;
program code to perform interference cancellation (IC) on the first set of signals;
program code to normalize at least one remaining signal, after performing IC on the first set of signals;
program code to detect another set of signals from remaining neighboring cells after performing IC on the first set of signals;
program code to group a second set of signals, wherein the second set of signals is grouped from among the another set of signals, the second set of signals comprising a second strongest signal and zero or more signals within a second threshold of the second strongest signal; and
program code to rank signals in the first set of signals and the second set of signals by determining a rank of a specific signal.

13. The computer program product of claim 12 in which ranking is further based on a priority of the specific signal within a specific set of signals.

14. The computer program product of claim 12 further comprising program code to apply the ranking during one or more of a next neighboring cell search cycle, IC in another logical operation, or a combination thereof.

15. The computer program product of claim 12 further comprising program code to use the ranking for later IC.

16. An apparatus configured for ranking signals received from neighboring cells in a wireless communication network, the apparatus comprising:
at least one processor; and
a memory coupled to the at least one processor, the at least one processor being configured:
to detect a set of signals from neighboring cells during a cell search period to group a first set of signals from the set of signals, the first set of signals comprising a first strongest signal and zero or more signals within a threshold of the first strongest signal;
to perform interference cancellation (IC) on the first set of signals;
to normalize at least one remaining signal, after performing IC on the first set of signals;
the at least one processor is further configured to detect another set of signals from remaining neighboring cells after performing IC on the first set of signals;
to group a second set of signals, wherein the second set of signals is grouped from among the another set of signals, the second set of signals comprising a second strongest signal and zero or more signals within a second threshold of the second strongest signal; and
to rank signals in the first set of signals and the second set of signals by determining a rank of a specific signal.

17. The apparatus of claim 16 in which ranking is further based on a priority of the specific signal within a specific set of signals.

18. The apparatus of claim 16 in which the first set of signals and the second set of signals include a primary synchronization signal (PSS) and a secondary synchronization signal (SSS).

19. The apparatus of claim 16 in which the at least one processor is further configured to apply the ranking during one or more of a next neighboring cell search cycle, IC in another logical operation, or a combination thereof.

20. The apparatus of claim 16 in which the at least one processor is further configured to group the first set of signals and group the second set of signals based at least in part on one or more of physical broadcast channel confirmation, cell specific reference signaling (CRS), channel state information reference signaling (CSI-RS), or a combination thereof.

21. The apparatus of claim 16 in which the at least one processor is further configured to use the ranking for later IC.

22. The apparatus of claim 16 in which the at least one processor is further configured to, for each detected signal, record one or more of a cell ID, radio frame boundary timing information, cyclic prefix (CP) information, a time stamp, layer information, or a combination thereof.

* * * * *